United States Patent
Bro et al.

(10) Patent No.: US 11,284,266 B2
(45) Date of Patent: Mar. 22, 2022

(54) COMMUNICATION NETWORK AND METHOD FOR OPERATING A COMMUNICATION NETWORK

(71) Applicant: SIEMENS MOBILITY GMBH, Munich (DE)

(72) Inventors: Lars Bro, Olstykke (DK); Jahanzeb Farooq, Smorum (DK); Rasmus Thystrup Karstensen, Ballerup (DK)

(73) Assignee: Siemens Mobility GmbH, Munich (DE)

( * ) Notice: Subject to any disclaimer, the term of this patent is extended or adjusted under 35 U.S.C. 154(b) by 127 days.

(21) Appl. No.: 16/625,888

(22) PCT Filed: Jun. 1, 2018

(86) PCT No.: PCT/EP2018/064434
§ 371 (c)(1),
(2) Date: Dec. 23, 2019

(87) PCT Pub. No.: WO2018/234010
PCT Pub. Date: Dec. 27, 2018

(65) Prior Publication Data
US 2020/0154279 A1 May 14, 2020

(30) Foreign Application Priority Data

Jun. 23, 2017 (DE) ..................... 10 2017 210 668.9

(51) Int. Cl.
*B61L 27/00* (2006.01)
*H04B 7/26* (2006.01)
(Continued)

(52) U.S. Cl.
CPC ......... *H04W 16/06* (2013.01); *B61L 27/0005* (2013.01); *H04B 7/2606* (2013.01);
(Continued)

(58) Field of Classification Search
CPC ... H04W 16/06; H04W 28/10; H04W 84/005; H04W 84/18; B61L 27/0005; B61L 27/0077; H04B 7/2606
See application file for complete search history.

(56) References Cited

U.S. PATENT DOCUMENTS 4,209,749 A 6/1980 Becker et al.
2005/0259619 A1 11/2005 Boettle et al.
(Continued)

FOREIGN PATENT DOCUMENTS

DE 602004001455 T2 12/2006
DE 102017203040 A1 8/2018

*Primary Examiner* — Kent Krueger
(74) *Attorney, Agent, or Firm* — Laurence A. Greenberg; Werner H. Stemer; Ralph E. Locher

(57) ABSTRACT

A communication network has at least one mobile wireless device and a plurality of further wireless devices installed on a line. In order to exclude or to minimize data packet losses in the communication network, a respective wireless device of the further wireless devices is configured to operate in each of the two directions of the line for communication with other wireless devices of the further wireless devices of a respective wireless channel pair. The mobile wireless device is configured to operate all wireless channels of the wireless channel pair exclusively for receiving data. An additional wireless channel is provided. The mobile wireless device is suitably configured to operate the additional wireless channel exclusively for transmitting data, and the further wireless devices are configured to operate the additional wireless channel exclusively for receiving data.

20 Claims, 3 Drawing Sheets

(51) Int. Cl.
  *H04W 16/06* (2009.01)
  *H04W 28/10* (2009.01)
  *H04W 84/00* (2009.01)
  *H04W 84/18* (2009.01)

(52) U.S. Cl.
  CPC ......... *H04W 28/10* (2013.01); *H04W 84/005* (2013.01); *H04W 84/18* (2013.01)

(56) References Cited

U.S. PATENT DOCUMENTS

| | | |
|---|---|---|
| 2008/0095134 A1 | 4/2008 | Chen et al. |
| 2012/0218886 A1 | 8/2012 | Van Phan et al. |
| 2014/0003327 A1* | 1/2014 | Seo .................... H04B 7/18541 |
| | | 370/315 |
| 2014/0112158 A1* | 4/2014 | Tavildar ............... H04B 7/2606 |
| | | 370/246 |
| 2017/0013519 A1* | 1/2017 | Hahn ................ H04W 74/0833 |

* cited by examiner

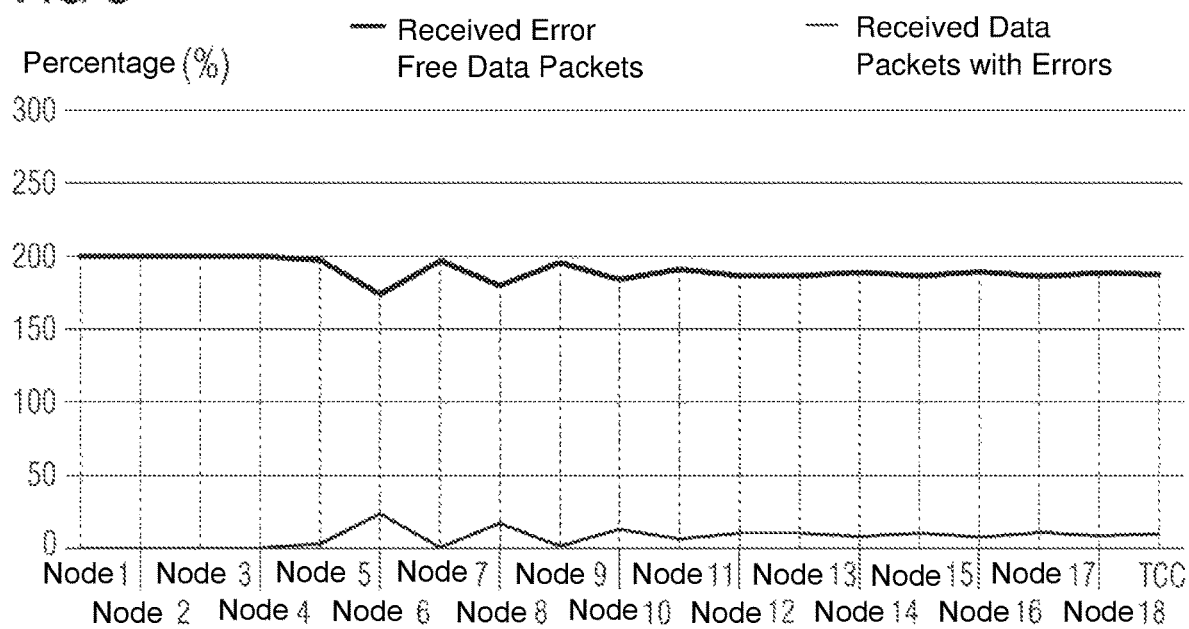

COMMUNICATION NETWORK AND METHOD FOR OPERATING A COMMUNICATION NETWORK

BACKGROUND OF THE INVENTION

Field of the Invention

The invention relates to a communication network, in particular to an ad-hoc communication network, having at least one mobile wireless facility and having a plurality of further wireless facilities that are installed on a track section.

An earlier German patent application of the applicant which was filed for a patent under the application file reference 10 2017 203 040.2 (DE) describes a generic communication network that is configured as an ad-hoc communication network. In the case of two of the exemplary embodiments of the ad-hoc communication network described in said document, a respective wireless facility of the further wireless facilities is configured in a suitable manner so as to use respectively a wireless channel pair in each of the two directions of the track section for communicating with other wireless facilities of the further wireless facilities.

FIG. 1 illustrates also a communication network KN* in the form of an ad-hoc communication network having a mobile wireless facility FT* and having a plurality of further wireless facilities Fi* that are installed on a track section and are also referred to below as nodes. A communication participant in particular a vehicle-side monitoring and control unit TC* is connected to the mobile wireless facility FT*, said communication participant being installed in a rail-born vehicle in the form of a train T. The communication network KN* illustrated in FIG. 1 also comprises another wireless facility FTCC* to which is connected another communication participant. The other communication participant is a track-side monitoring and control unit TCC* in the form of a so-called Traffic Control Center. The mobile wireless facility FT* is located in this case on a left-hand end of a chain K* that is formed from four of the further wireless facilities.

The other wireless facility FTCC* is located at a right-hand end of this chain K*. The mobile wireless facility FT* and the other wireless facility FTCC* are therefore also referred to below as side wireless facilities. If the mobile wireless facility FT* which is connected using data transmission technology in a suitable manner to the vehicle-side monitoring and control unit TC* transmits data that is provided by the vehicle-side monitoring and control unit in the form of data packets, then said data is forwarded by means of the nodes Fi*. The data is therefore transmitted via the chain K* to the other wireless facility FTTC* and is consequently available to the Traffic Control Center TCC* that is connected using data transmission technology in a suitable manner to the other wireless facility.

Each of the further wireless facilities Fi*—in other words each of the nodes K*—is equipped with three wireless devices that are each on different frequencies, in other words they are using different wireless channels K1*, K2* and K3*. This is illustrated in FIG. 1 by means of the dotted line for K1*, dashed line for K2* and dashed-dotted line for K3*. These three frequencies or wireless channels K1*, K2* and K3* are then used in an alternating manner in the subsequent nodes. In this manner, a specific frequency separation is introduced that minimizes interference.

Two of the three wireless devices that are also referred to below as side wireless devices are each configured in a suitable manner as a transmitting and receiving unit SE* for a bidirectional communication, in that they each use a directional antenna that is arranged to the side. In order to introduce redundancy, a side wireless device SE* of one node not only transmits to the directly adjacent node but rather also transmits to the node that follows this. The above arranged third wireless device is configured in a suitable manner as a receiving unit E* for receiving data packets from the directly adjacent nodes from both directions R1* and R2* of the track section, in that it is equipped with an omnidirectional antenna.

If a respective node Fi* receives from another node a data packet on any one of the three wireless devices, the respective node Fi* forwards the data packet to the adjacent node and to the node that immediately follows this—in other words to the next and the next-but-one node. In other words, the respective node Fi* forwards the data packet in the same direction since data packets that are forwarded by a node in a specific direction to a next or next-but-one node are provided with additional information with reference to which the next or next-but-one node that receives the data packet is able to detect that said node is to forward the data packet in this specific direction.

In contrast to the nodes of the chain K*, the two side wireless facilities—in other words the mobile wireless facility FT* and the other wireless facility FTCC*—are each provided with three wireless devices, wherein each of the wireless devices is configured as a transmitting and receiving unit SE1*, SE2* or SE3* each with an omnidirectional antenna, in order to use the three wireless channels both for receiving data and also for transmitting data—and in fact respectively in all directions—in other words in each case in an omnidirectional manner. In this manner, the vehicle-side monitoring and control unit TC* of the train T* is always able to communicate with a respective node of the nodes Fi* of the chain K*, regardless of the orientation of the antenna of the respective node of the chain relative to the antennae of the mobile wireless facility FT* of the train.

A performance evaluation of this communication network KN* that was performed using computer simulations in different scenarios has however demonstrated that in the case of this communication network transmissions from the mobile wireless facility FT* interfere with the transmissions of their nearest 1 to 3 nodes of the chain K* (apparent in FIG. 1, in the case of the second node, at its third wireless device that is arranged above—in other words on the same wireless channel K2*—the data packets are transmitted both from the mobile wireless facility FT* and also from the first node). The interference that occurs in the case of these transmissions results in a loss of data packets. In the case of the scenario illustrated in FIG. 2 having a mobile wireless facility FT* of a train T*, another wireless facility FTCC* of a track-side monitoring and control unit TCC* and a chain K* of 20 nodes interference in accordance with the computer simulations used results in a loss of data packets amounting to 5.63%. Computer simulations in other scenarios having two mobile wireless facilities (2-train-scenarios) demonstrated losses of data packets up to 20%.

In FIG. 2, the Y-axis of the illustrated diagram represents the number of received data packets as a percentage of the original transmitted data packets. Since one node forwards a data packet to the next node and to the next-but-one node, a given node should in the ideal case receive two copies of a data packet, in other words 200% total packets received. The upper line illustrates in this case the percentage of the data packets received defect-free. Accordingly, the lower line illustrates the percentage of data packets received as defective.

SUMMARY OF THE INVENTION

The object of the invention is to provide a communication network without any loss or with minimal loss of the data packets.

This object is achieved by means of a communication network, in particular an ad-hoc communication network, having at least one mobile wireless facility and having a plurality of further wireless facilities that are installed on a track section, wherein a respective wireless facility of the further wireless facilities is configured in a suitable manner so as to use respectively a wireless channel pair in each of the two directions of the track section for communicating with other wireless facilities of the further wireless facilities, the mobile wireless facility is configured in a suitable manner so as to use all wireless channels of the wireless channel pairs exclusively for receiving data in particular from the further wireless facilities, an additional wireless channel is provided, the mobile wireless facility is configured in a suitable manner so as to use the additional wireless channel exclusively for forwarding data in particular to the further wireless facilities, and the further wireless facilities are configured in a suitable manner so as to use the additional wireless channel exclusively for receiving data in particular from the mobile wireless facility.

As also demonstrated below, computer simulations have shown that in the case of a configuration of this type of a communication network the losses of data packets are very low.

It is regarded as advantageous if the wireless channel pairs are formed in such a manner from three wireless channels that the wireless channel pairs of a respective wireless facility of the further wireless facilities differ with respect to a wireless channel. It is preferred that the further wireless facilities are configured in this case in such a manner that respective three sequential wireless facilities of the further wireless facilities use the three wireless channels in an alternating manner. As a consequence, the so-called hidden-node-problem may be solved in a particularly efficient manner.

It is possible to connect to the mobile wireless facility a communication participant, in particular a vehicle-side monitoring and control unit that is installed in a vehicle in particular in a rail-borne vehicle.

In addition, it is possible to connect at least one other communication participant, in particular a track-side monitoring and control unit, to one of the further wireless facilities or to another wireless facility.

In this case, it is regarded as advantageous if the other wireless facility is configured in a suitable manner so as to use all wireless channels of the wireless channel pairs exclusively for receiving data in particular from the further wireless facilities, the other wireless facility is configured in a suitable manner so as to use the additional wireless channel exclusively for forwarding data in particular to the further wireless facilities, and the further wireless facilities are configured in a suitable manner so as to use the additional wireless channel in particular also for receiving data from the other wireless facility.

The invention relates also to a method for operating a communication network, in particular an ad-hoc communication network, which is provided with at least one mobile wireless facility and a plurality of further wireless facilities that are installed on a track section, wherein a respective wireless facility of the further wireless facilities uses respectively a wireless channel pair in each of the two directions of the track section for communicating with other wireless facilities of the further wireless facilities, the mobile wireless facility uses all wireless channels of the wireless channel pairs exclusively for receiving data in particular from the further wireless facilities, an additional wireless channel is provided, the mobile wireless facility uses the additional wireless channel exclusively for forwarding data in particular to the further wireless facilities, and the further wireless facilities use the additional wireless channel exclusively for receiving data in particular from the mobile wireless facility.

With respect to the advantages of the method in accordance with the invention, reference is made to the advantages of the communication network in accordance with the invention since the advantages of the method in accordance with the invention correspond essentially to the advantages of the communication network in accordance with the invention.

It is preferred in the case of the method in accordance with the invention that the wireless channel pairs are formed in such a manner from three wireless channels that the wireless channel pairs of a respective wireless facility of the further wireless facilities differ with respect to a wireless channel. In this case, it is advantageous if the further wireless facilities are configured in such a manner that respective three successive wireless facilities of the further wireless facilities use the three wireless channels in an alternating manner.

In addition, it is regarded as advantageous if a communication participant, in particular a vehicle-side monitoring and control unit, is connected to the mobile wireless facility, said communication participant being installed in a vehicle in particular in a rail-borne vehicle.

At least one other communication participant in particular a track-side monitoring and control unit may be connected in an advantageous manner to one of the further wireless facilities or to another wireless facility.

In this case, it is regarded as advantageous if the other wireless facility uses all wireless channels of the wireless channel pairs exclusively for receiving data in particular from the further wireless devices, the other wireless facility uses the additional wireless channel exclusively for forwarding data in particular to the further wireless facilities, and the further wireless facilities use the additional wireless channels in particular also for receiving data from the other wireless facility.

BRIEF DESCRIPTION OF THE SEVERAL VIEWS OF THE DRAWING

The invention is further explained below with reference to FIGS. 3 to 5. In the drawings:

FIG. 4 shows a segment of the chain shown in FIG. 3 having five adjacent further wireless facilities and FIG. 5 shows a result of a computer simulation that has been performed in a scenario of the communication network in accordance with the invention.

DESCRIPTION OF THE INVENTION

Figure 3:
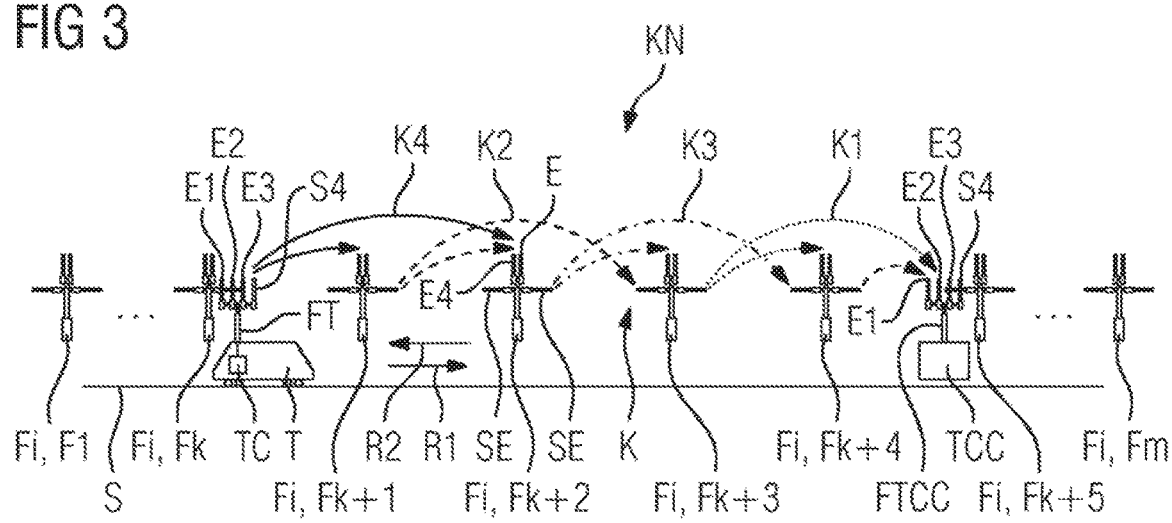
FIG. 3 shows a section of a communication network having one mobile wireless facility, another wireless facility and a plurality of further wireless facilities that form a chain of nodes.

FIG. 3 illustrates a communication network KN in accordance with the invention without a network backbone, said communication network being configured in a suitable manner so as to ensure a continuous communication connection between a mobile wireless facility FT of a communication participant TC and another wireless facility FTCC of another communication participant TCC.

The particular communication participant TC illustrated here is installed in a vehicle—in this case a rail-borne vehicle in the form of a train T. The particular communication participant TC is in this case a vehicle-side monitoring and control unit that is able via the illustrated connection to provide the mobile wireless facility FT with data packets that are to be forwarded or is able to accept data packets that are received from this mobile wireless facility.

The other communication participant TCC illustrated here is a track-side monitoring and control unit. Said unit could be connected to one of the further wireless facilities Fi* in a suitable manner using data technology in order to provide data packets that are to be forwarded or to accept received data packets. However, in the case of the illustrated communication network KN, the track-side monitoring and control unit TCC is connected to the other wireless facility FTCC via a connection in a suitable manner using data technology in order to provide the other wireless facility FTCC with data packets that are to be forwarded or in order to accept data packets that are received from the other wireless facility FTCC.

The illustrated section of the communication network KN illustrates eight of the plurality m of the further wireless facilities, namely a first F1, six sequential Fk, Fk+1, Fk+2, Fk+3, Fk+4, Fk+5 and a last Fm.

A respective Fi from the i=1, 2, ..., k, k+1, k+2, k+3, k+4, k+5, ..., to m of the further wireless facilities is configured in a suitable manner so as to use respectively a wireless channel pair A, B or C in each of the two directions R1 and R2 of the track section S for communicating with other wireless facilities of the further wireless facilities.

The wireless channel pair that is identified by A comprises in this case the wireless channels K1 and K2. The wireless channel pair that is identified by B comprises the wireless channels K2 and K3. The wireless channel pair C comprises the wireless channels K3 and K1.

In this case, the wireless channel pairs A,B and C are formed from the three wireless channels K1, K2 and K3 in such a manner that the wireless channel pairs A and B or B and C or C and A of a respective wireless facility Fi of the further wireless facilities differ with respect to a wireless channel. Respective three successive wireless facilities of the further wireless facilities use three wireless channels in an alternating manner.

However, an embodiment of the communication network in accordance with the invention is also possible that requires only two channels so as to form the wireless channel pairs of all further wireless facilities.

The mobile wireless facility FT is configured in a suitable manner so as to use all wireless channels K1, K2, K3 of the wireless channel pairs A, B and C exclusively for receiving data in particular from the further wireless facilities.

An additional wireless channel K4 is provided.

The mobile wireless facility FT is configured in a suitable manner so as to use the additional wireless channel K4 exclusively for forwarding data in particular to the further wireless facilities Fi.

The further wireless facilities Fi are configured in a suitable manner so as to use the additional wireless channel K4 exclusively for receiving data in particular from the mobile wireless facility FT.

Each wireless facility Fi comprises a receiving unit E for receiving data from the further wireless facilities that are directly adjacent to the wireless facility Fi and also from two transmitting and receiving units SE, SE. Each of the two transmitting and receiving units SE, SE are used respectively for a bidirectional communication with one of the further wireless facilities that follows one of the directly adjacent further wireless facility.

It is also the case here that, if a respective node Fi receives from another node a data packet on any one of the three wireless facilities, said node forwards this data packet to the adjacent node and to the node that directly follows said adjacent node—in other words to the next and the next-but-one node. The respective node Fi therefore transmits the data packet in the same direction since data packets that are forwarded from one node in a specific direction to a next or next-but-one node are provided with additional information with reference to which the next or next-but-one node that receives the data packet is able to detect that it is expected to forward the data packet in this specific direction.

Only one node that receives a data packet from the mobile wireless facility forwards the data packet initially in both directions R1 and R2 of the track section (in FIG. 3 by way of example the node Fk+1). The same procedure occurs if a node receives a data packet from the other wireless facility.

The communication and data transmission is performed via the three different wireless channels K1, K2, K3 in a spatially alternating pattern.

This pattern is explained below with reference to the sections illustrated in FIG. 4.

The further wireless facilities Fk+1 is configured so as by means of its receiving unit E to receive data from the further wireless facilities Fk and Fk+2 that are directly adjacent to the further wireless facility Fk+1 via one of the three channels—namely the channel K1 that is also referred to below as the first channel. The channel K1 is illustrated respectively by means of a dotted line.

The further wireless facility Fk+2 that is next in the direction R1—in other words adjacent in the direction R1 to Fk+1—is configured so as by means of its receiving unit E to receive data from the two track-side wireless facilities Fk+1 and Fk+3 that are directly adjacent to the further wireless facility Fk+2 via another of the three wireless channels—namely the channel K2 that is also referred to below as the second channel. The channel K2 is illustrated respectively by means of the dashed line.

The further wireless facility Fk+3 that follows in the direction R1—in other words adjacent in the direction R1 to Fk+2—is configured so as by means of its receiving unit E to receive data from the two track-side wireless facilities Fk+2 and Fk+4 that are directly adjacent to the further wireless facility Fk+3 via another of the three wireless channels—namely the channel K3 that is also referred to below as the third channel. The channel K3 is illustrated respectively by means of the dashed-dotted line.

According to repetitions of this pattern along the track section S, the further wireless facility Fk+4 that follows the further wireless facility Fk+3 in the direction R1 is configured so as by means of its receiving unit E to receive data from the track-side wireless facilities Fk+3 and Fk+5 (cf. FIG. 4) that are directly adjacent to the wireless facility Fk+4 via the first channel K1.

And the further wireless facility Fk that is positioned upstream of the further wireless facility Fk+1 in the direction R1—in other words adjacent in the direction R2—is configured so as by means of its receiving unit E to receive data from the track-side wireless facilities Fk−1 (not illustrated) and Fk+1 that are directly adjacent to the wireless facility Fk+1 via the third channel 3.

Respective three successive wireless facilities of the further wireless facilities, by way of example Fk, Fk+1 and Fk+2, use the three wireless channels in an alternating manner.

In other words, data packets are forwarded in a unidirectional manner along the travel track section S in each direction respectively, in that the further wireless facilities Fi of the three wireless channels K1, K2 and K3 are used in an alternating manner.

Figure 4:
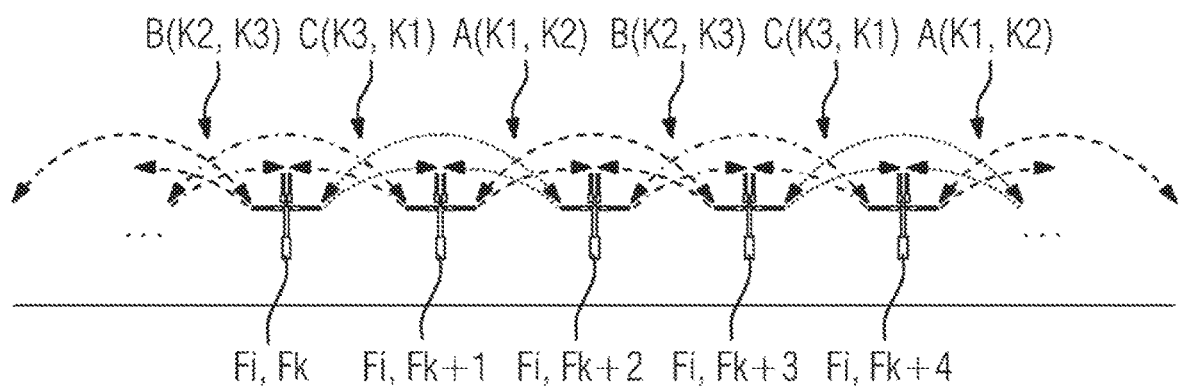

In accordance with FIG. 4, the further wireless facility Fk+2 communicates with its next-but-one, right-hand side neighbor Fk+4 in a bidirectional manner on the third channel K3. Moreover, said further wireless facility communicates with the next-but-one, left-hand side neighbor Fk in a bidirectional manner on the first channel K1 and receives data from its left-hand side and right-hand side direct neighbor in a unidirectional manner via the first channel K2.

The further wireless facilities Fk+3 communicates with its next-but-one, right-hand side neighbor Fk+5 in a bidirectional manner on the first channel K1 and communicates with the next-but-one, left-hand side neighbor Fk+1 in a bidirectional manner on the second channel K2.

The further wireless facility Fk+1 communicates with its next-but-one right-hand side neighbor Fk+3 in a bidirectional manner on the second channel K2 and communicates with the next-but-one, left-hand side neighbor Fk−1 (not illustrated) in a bidirectional manner on the third channel K3.

In other words, each further wireless facility Fi receives data from its directly adjacent further wireless facilities on one of the three different channels, communicates in a bidirectional manner with its next-but-one neighbor in a first direction along the travel track section S on another of the three channels and communicates with its next-but-one neighbor in a second direction that is opposite to the first direction on a last channel of the three channels.

In this multi-channel configuration, the three adjacent further wireless facilities Fk, Fk+1, Fk+2 use the first wireless channel K1 in the manner that the middle Fk+1 receives data packets exclusively on the first wireless channel K1 and the two directly adjacent outer wireless facilities Fk and Kk+2 forward data packets on this channel.

Only in the case of the triplets Fk+3, Fk+4, Fk+5 do the two directly adjacent outer wireless facilities Fk+3 and Kk+5 forward data packets on this channel K1, wherein the middle wireless facility Fk+4 receives data packets exclusively on the channel K1.

As a consequence, the hidden-node-problem may be solved in a simple manner.

In the case of the communication network KN in accordance with the invention, the additional wireless channel K4 that is different to the three wireless channels K1, K2 and K3 is used for communicating from the mobile wireless facility FT of the train T to the chain K of the nodes that are formed by the further wireless facilities Fi—and in fact exclusively for forwarding data packets to the chain K. In other words, data packets are not received on this channel K4 by the mobile wireless facility FT.

In order to receive data on the three wireless channels K1, K2 and K3, the mobile wireless facility FT comprises three receiving units E1, E2, E3 each having an omnidirectional antenna. The first receiving unit E1 receives data packets on the first channel K1. The second receiving unit E2 receives data packets on the second channel K2. And the third receiving unit E3 receives data packets on the third channel K3.

The mobile wireless facility is equipped in addition with a transmitting unit S4 having an omnidirectional antenna that is set to an additional frequency—in other words uses the additional wireless channel K4. The mobile wireless facility uses this additional wireless channel K4 exclusively for forwarding data packets but not for receiving data packets.

In this manner, the transmissions from the mobile wireless facility FT of the train T do not interfere with the transmissions from the nodes Fi of the chain.

Each of the further wireless facilities Fi—in other words each node of the chain K is equipped with an additional receiving unit E4 that is set to an additional frequency in order to use the additional wireless channel K4 exclusively for receiving the data packets. In a respective node Fi of the chain, the respective additional receiving unit E4 is therefore used only for receiving in particular data packets from the mobile wireless facility FT.

In the case of the illustrated communication network, the other wireless facility FTCC also comprises three receiving units E1, E2, E3, each having an omnidirectional antenna, for receiving data on the three wireless channels K1, K2 and K3. The first receiving unit E1 receives data packets on the first channel K1. The second receiving unit E2 receives data packets on the second channel K2. And the third receiving unit E3 receives data packets on the third channel K3.

The other wireless facility FTCC is equipped in addition with a transmitting unit S4 having an omnidirectional antenna that is set to the additional frequency—in other words it also uses the additional wireless channel K4. The other wireless facility uses this additional wireless channel K4 exclusively for forwarding data packets but not for receiving data packets.

In a respective node Fi of the chain, the respective additional receiving unit E4 is therefore also used for receiving data packets from the other wireless facility FTCC.

FIG. 5 illustrates the results of a computer simulation that has been performed in a scenario of the communication network that is illustrated in FIG. 3.

Figure 2:
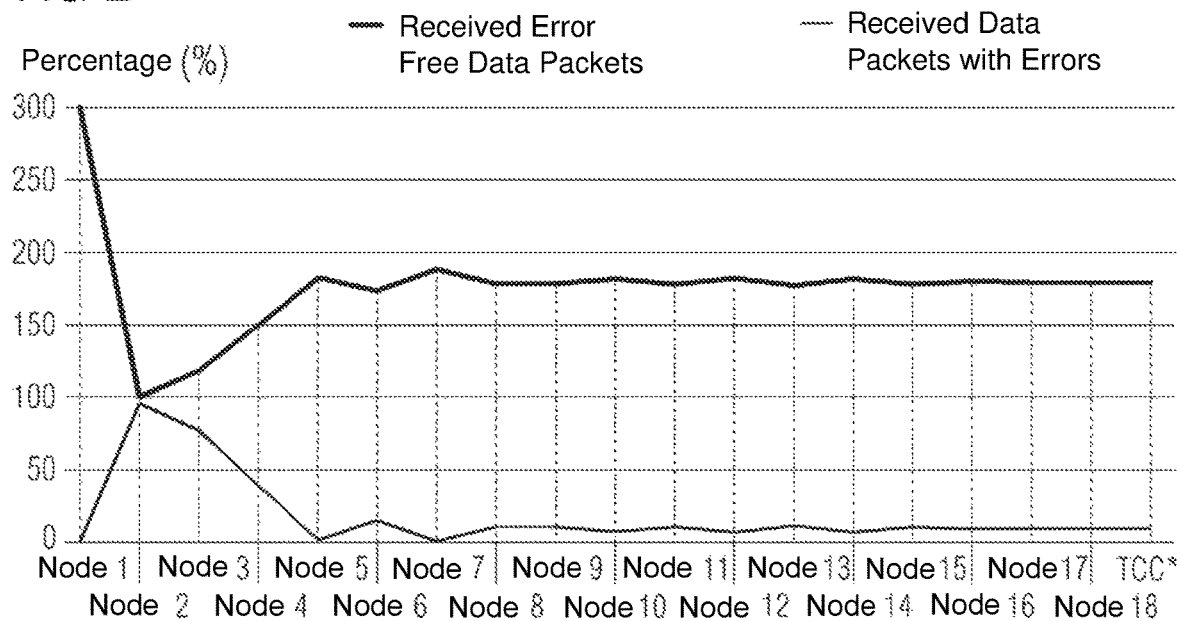
FIG. 2 is a diagram illustrating the number of received data packets as a percentage of the original transmitted data packets.

As in the case of the computer simulation the results of which are illustrated in FIG. 2, a scenario having a mobile wireless facility FT of a train, another wireless facility FTCC and a chain K of 20 nodes Fi was also selected in the case of the computer simulation of the communication network in accordance with the invention.

Figure 1:
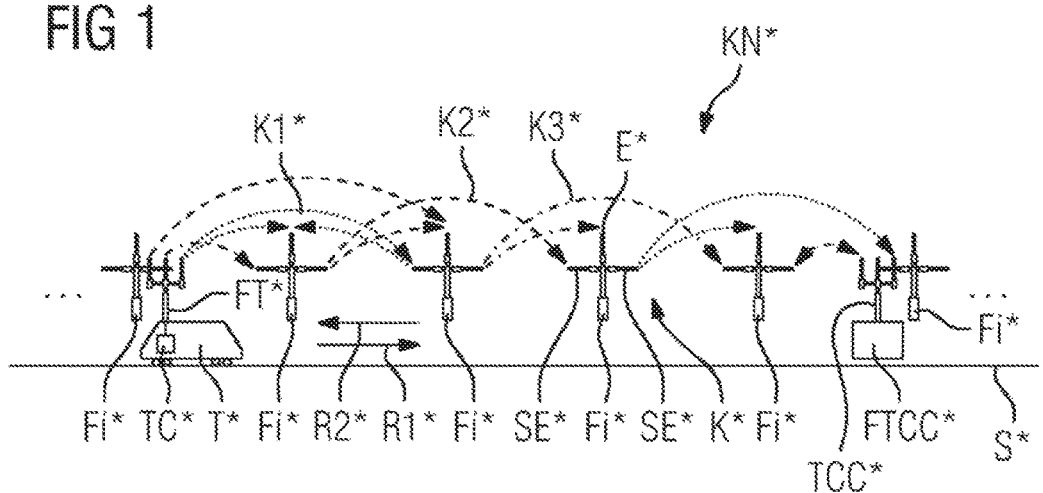
FIG. 1 is an illustration of a communication network.

It is apparent that the interference that occurs in the case of the communication network that is illustrated in FIG. 1 is very effectively eliminated in the case of the communication network in accordance with the invention according to FIG. 3. The data packet losses that are apparent in FIG. 5 are reduced to 0.4% in comparison to FIG. 2.

The communication network KN may be by way of example a WLAN (wireless area network) or Wi-Fi in accordance with the standard family IEEE 802.11. In this case, it is possible to use by way of example the Standard 802.11p for communication between the train T and the further wireless facilities Fi and one or multiples of the Standards 802.11abg/802.11n/802.11ac for the communication between the further wireless facilities Fi. Alternatively, it is possible for this purpose for the communication between the train T and the track section or rather the further wireless facilities Fi by way of example also to be performed in accordance with the mobile wireless standard LTE (Long Term Evolution) and the communication between the track-side components by way of example network nodes to be performed by means of WLAN or Wi-Fi.

Consequently, the additional wireless channel K4 represents a dedicated wireless channel (dedicated frequency) for in particular trains in a communication network, in particular an ad-hoc communication network for continuous communication between the trains and the track-side infrastructure.

The invention claimed is:

1. A communication network, comprising:
at least one mobile wireless facility;
a plurality of further wireless facilities installed on a track section, wherein a respective wireless facility of the further wireless facilities is configured to use a first wireless channel pair of a plurality of wireless channel pairs for communicating with other wireless facilities of the further wireless facilities in one direction of the track section and is configured to use a second wireless channel pair of the wireless channel pairs for communicating with other wireless facilities of the further wireless facilities in an opposite direction of the track section;
said mobile wireless facility is configured so as to use all wireless channels of the wireless channel pairs exclusively for receiving data;
an additional wireless channel;
said mobile wireless facility is configured so as to use said additional wireless channel exclusively for forwarding data to said further wireless facilities; and
said further wireless facilities are configured to use said additional wireless channel exclusively for receiving data from said mobile wireless facility.

2. The communication network according to claim 1, wherein said wireless channel pairs are formed from three wireless channels in such a manner that said wireless channel pairs of the respective wireless facility of said further wireless facilities differ with respect to a wireless channel.

3. The communication network according to claim 2, wherein said further wireless facilities are configured in such a manner that respective three successive further wireless facilities of said further wireless facilities use the three wireless channels in an alternating manner.

4. The communication network according to claim 1, further comprising a communication participant connected to said mobile wireless facility, said communication participant being installed in a vehicle.

5. The communication network according to claim 4, further comprising:
another wireless facility; and
at least one other communication participant connected to one of said further wireless facilities or to said another wireless facility.

6. The communication network according to claim 5, wherein:
said another wireless facility is configured so as to use all said wireless channels of said wireless channel pairs exclusively for receiving data;
said another wireless facility is configured so as to use said additional wireless channel exclusively for forwarding data to the further wireless facilities; and
said further wireless facilities are configured so as to use said additional wireless channel for receiving the data from said another wireless facility.

7. The communication network according to claim 5, wherein:
said mobile wireless facility is configured so as to use all the wireless channels of the wireless channel pairs exclusively for receiving the data from said further wireless facilities;
said mobile wireless facility is configured so as to use said additional wireless channel exclusively for forwarding the data to said further wireless facilities; and
said further wireless facilities are configured to use said additional wireless channel exclusively for receiving the data from said mobile wireless facility.

8. The communication network according to claim 4, wherein:
said communication participant is a vehicle-side monitoring and control unit; and
the vehicle is a rail-born vehicle.

9. The communication network according to claim 5, wherein said at least one other communication participant is a track-side monitoring and control unit.

10. The communication network according to claim 6, wherein:
said another wireless facility is configured so as to use all said wireless channels of said wireless channel pairs exclusively for receiving the data from said further wireless facilities; and
said another wireless facility is configured so as to use said additional wireless channel exclusively for forwarding data to said further wireless facilities.

11. A method for operating a communication network having at least one mobile wireless facility and a plurality of further wireless facilities that are installed on a track section, which comprises the steps of:
communicating between a respective wireless facility of the further wireless facilities and other wireless facilities of the further wireless facilities in one direction of the track section using a first wireless channel pair of a plurality of wireless channel pairs and communicating between the respective wireless facility of the further wireless facilities and other wireless facilities of the further wireless facilities in an opposite direction of the track section using a second wireless channel pair of the wireless channel pairs;
using all wireless channels of wireless channel pairs exclusively for receiving data in the mobile wireless facility; and
providing an additional wireless channel, wherein the mobile wireless facility uses the additional wireless channel exclusively for forwarding data to the further wireless facilities, and the further wireless facilities uses the additional wireless channel exclusively for receiving data from the mobile wireless facility.

12. The method according to claim 11, which further comprises forming the wireless channel pairs from three wireless channels in such a manner that the wireless channel pairs of a respective wireless facility of the further wireless facilities differ with respect to a wireless channel.

13. The method according to claim 12, which further comprises configuring the further wireless facilities in such a manner that respective three successive wireless facilities of the further wireless facilities use the three wireless channels in an alternating manner.

14. The method according to claim 11, which further comprises connecting a communication participant to the mobile wireless facility, the communication participant being installed in a vehicle.

15. The method according to claim 11, which further comprises connecting at least one other communication participant to one of the further wireless facilities or to another wireless facility.

16. The method according to claim 15, wherein:
the another wireless facility uses all the wireless channels of the wireless channel pairs exclusively for receiving data;
the another wireless facility uses the additional wireless channel exclusively for forwarding data; and
the further wireless facilities use the additional wireless channel for receiving data from the other wireless facility.

17. The method according to claim 11, wherein:
the communication network is an ad-hoc communication network;
all the wireless channels of the wireless channel pairs are used exclusively for receiving the data in the mobile wireless facility from the further wireless facilities; and
the mobile wireless facility uses the additional wireless channel exclusively for forwarding the data to the further wireless facilities, and the further wireless facilities use the additional wireless channel exclusively for receiving the data from the mobile wireless facility.

18. The method according to claim 14, wherein:
the communication participant is a vehicle-side monitoring and control unit; and
the vehicle is a rail-born vehicle.

19. The method according to claim 15, wherein the other communication participant is a track-side monitoring and control unit.

20. The method according to claim 16, wherein:
the another wireless facility uses all the wireless channels of the wireless channel pairs exclusively for receiving the data from the further wireless facilities; and
the another wireless facility uses the additional wireless channel exclusively for forwarding the data to the further wireless facilities.

* * * * *